May 29, 1951 H. A. WINTERMUTE 2,555,216
ELECTRICAL PRECIPITATOR
Filed Sept. 24, 1946 7 Sheets-Sheet 3

INVENTOR.
Harry A. Wintermute.
BY
Stowell & Evans
Attorneys

May 29, 1951 H. A. WINTERMUTE 2,555,216
ELECTRICAL PRECIPITATOR
Filed Sept. 24, 1946 7 Sheets-Sheet 4

INVENTOR.
Harry A. Wintermute.
BY
Stowell & Evans
Attorneys

May 29, 1951 H. A. WINTERMUTE 2,555,216
ELECTRICAL PRECIPITATOR
Filed Sept. 24, 1946 7 Sheets-Sheet 5

SECTION 12-12

INVENTOR.
Harry A. Wintermute.
BY
Stowell & Evans
Attorneys

May 29, 1951  H. A. WINTERMUTE  2,555,216
ELECTRICAL PRECIPITATOR
Filed Sept. 24, 1946  7 Sheets-Sheet 6

INVENTOR.
Harry A. Wintermute.
BY
Stowell & Evans

May 29, 1951    H. A. WINTERMUTE    2,555,216
ELECTRICAL PRECIPITATOR
Filed Sept. 24, 1946    7 Sheets-Sheet 7
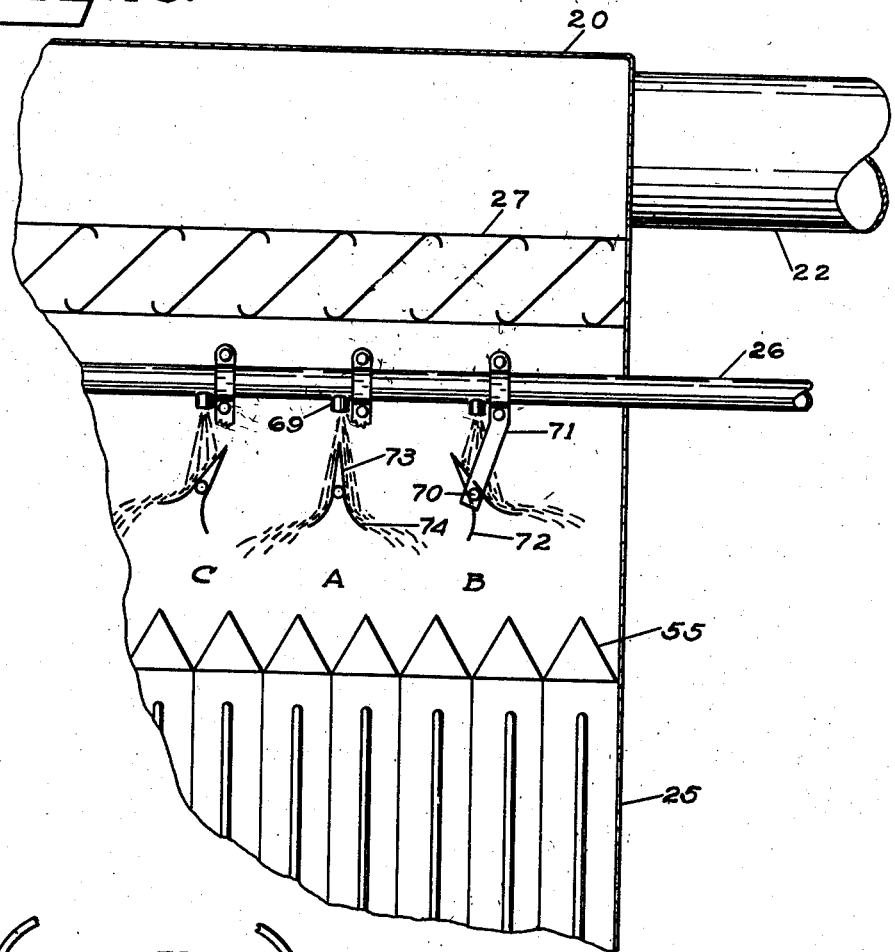
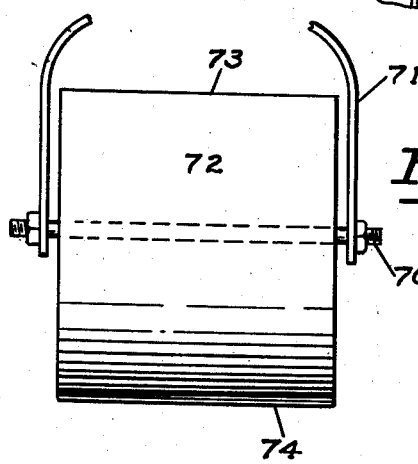
INVENTOR.
Harry A. Wintermute.
BY
Stowell & Evans Patented May 29, 1951

2,555,216

UNITED STATES PATENT OFFICE 2,555,216

ELECTRICAL PRECIPITATOR

Harry A. Wintermute, Plainfield, N. J., assignor to Research Corporation, New York, N. Y., a corporation of New York Application September 24, 1946, Serial No. 698,978

12 Claims. (Cl. 183—7)

This invention relates to electrical precipitators and more particularly to electrical precipitators having means providing for uniform gas flow therethrough and having liquid-flushed collecting electrodes.

An object of the invention is to provide an electrical precipitator, preferably but not necessarily a precipitator of the vertical-flow type, wherein the extended surface electrodes extend in the vertical direction and wherein means is provided for directing a spray of flushing liquid over the surfaces of the electrodes including liquid distributors for catching the spray and directing the intercepted liquid over the surfaces of the extended surface electrodes and wherein means is provided for establishing substantially uniform gas flow past the extended surface electrodes.

Another object is to provide an improved vertical-flow electrical precipitator of the type having a charging section wherein gas-borne particles are given an electrical charge and in part precipitated and a collecting or precipitating section wherein the charged particles are substantially completely removed from the gas stream. In such a precipitator, extended surface electrodes of novel construction and particularly adapted to be flushed free from precipitated matter in a very efficient manner have been provided. The novel extended surface electrodes specifically described herein are simply, easily and cheaply constructed in a preferred embodiment from perforate web material such as woven wire screen.

Typically, an electrical precipitator in accordance with the invention includes a casing, vertically extending extended surface electrodes defining a plurality of gas passages open at the tops thereof, complementary precipitating electrodes in each of said gas passages, liquid spray means positioned to direct a spray of flushing liquid above said extended surface electrodes, a plenum chamber in said casing on the upstream side of said passages, and gas inlet means opening into said plenum chamber. In such a precipitator, there is provided means for establishing substantially uniform gas flow through said gas passages comprising a perforate plate member extending transversely of said casing between said plenum chamber and said gas passages and a plurality of web members defining other gas passages extending from said perforate plate member rectilinearly towards said first gas passages, and liquid distributors comprising perforate web members sloping downwardly over the top openings of said first gas passages into substantial contact with said extended surface electrodes whereby to intercept liquid spray from said spray means and direct the flow of intercepted liquid to the surfaces of said extended surface electrodes.

The invention will be more particularly described and other of its aims, objects and advantages will be in part apparent and in part pointed out in the following detailed description taken in connection with the accompanying drawings in which:

Fig. 18 is an enlarged fragmentary vertical sectional view of the upper corner of an electrical precipitator similar to the precipitator of Fig. 1 showing a modified liquid spray device; and Fig. 19 is an enlarged detail side view of one of the spray deflectors shown in Fig. 18.

Figure 1:
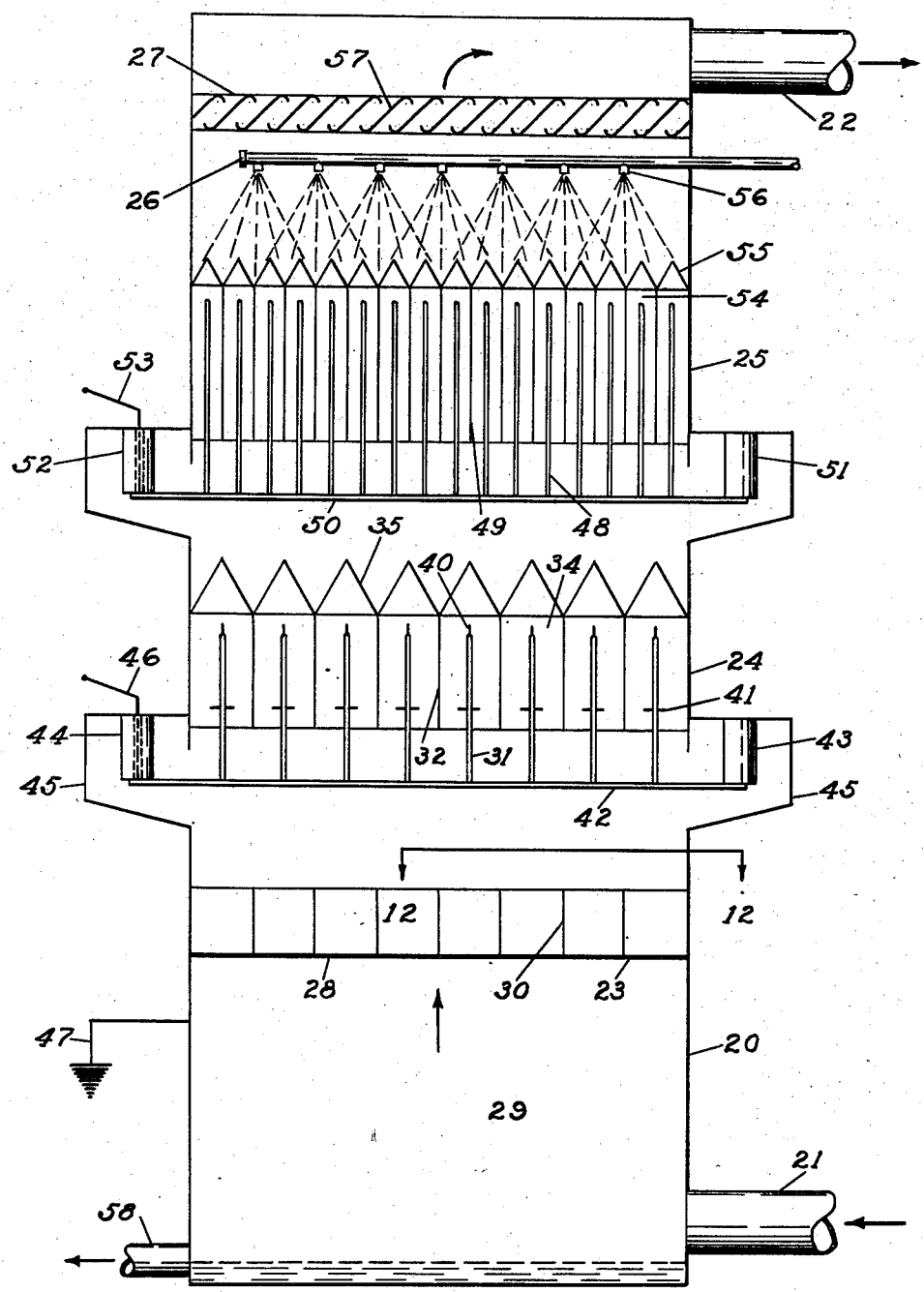
Fig. 1 is a vertical sectional view taken through an up-draft vertical-flow precipitator embodying the principles of the invention.

Referring particularly to Fig. 1, the up-draft, vertical-flow, two-stage precipitator shown has a casing 20, a gas inlet conduit 21 at the bottom, and a gas outlet conduit 22 at the top. Gas initially bearing suspended solid or liquid particulate matter, such as dust, smoke, mist and the like, is passed through the precipitator by a fan or other suitable means (not shown) in the directional sense of the arrows of Fig. 1, entering the precipitator from the inlet 21, flowing vertically upwardly through the casing 20 wherein it is cleaned, and leaving the apparatus in a cleaned condition by way of outlet 22.

Positioned within the casing successively in the direction of gas flow are a gas flow distributor 23, a charging section 24, a collecting section 25, a liquid spray device 26, and a spray eliminator 27.

Figure 13:
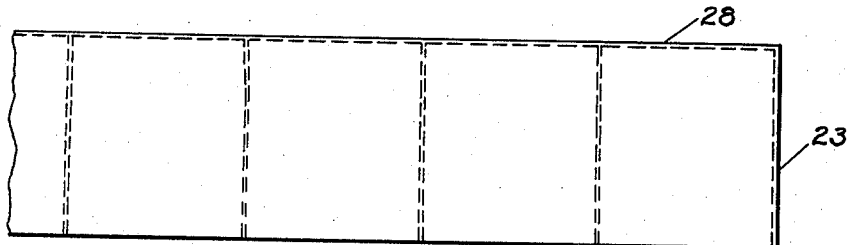
Fig. 13 is a side view of the assembly shown in Fig. 12.
Figure 12:
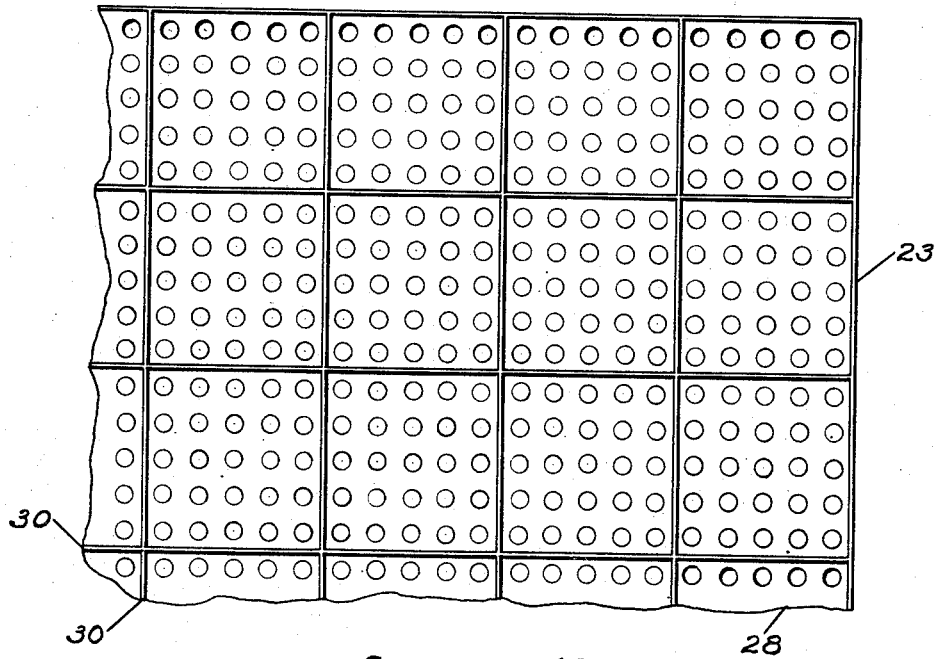
Fig. 12 is a sectional view taken along the line 12—12 of Figs. 1 and 2 showing the gas flow distributing assembly.

As best shown in Figs. 1, 12 and 13, the gas flow distributor has a perforate plate 28 extending transversely across the casing to define the upper boundary of a plenum chamber 29, the side and bottom boundaries of which are delimited by the lower side walls and bottom of the casing 20. Above the plate 28 there is positioned a cell-like structure, the cells of which are open at top and bottom and are formed by a plurality of web members 30 extending interlockingly across the casing. It will be observed that the web members 30 define gas passages extending from the perforate plate 28 rectilinearly toward the charging section 24.

The charging section 24 has a set of complementary discharge electrodes 31 and extended surface electrodes 32. The extended surface electrodes, shown more or less diagrammatically in Fig. 1, are shown in detail in Figs. 9 through 11 and their preferred method of assembly into a complete electrode structure is shown in Figs. 3 through 5.

Figure 9:
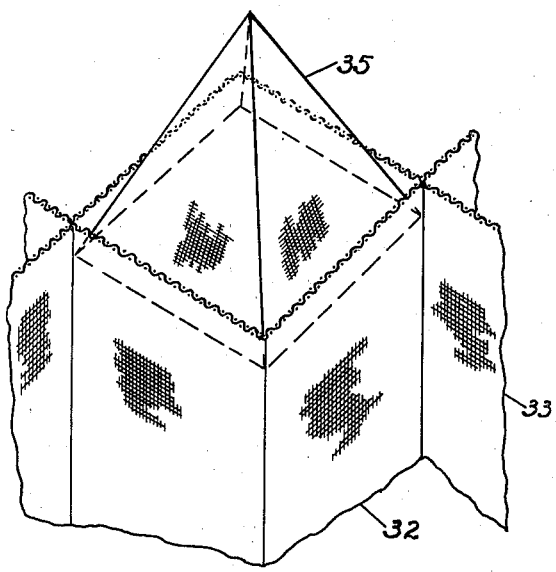
Fig. 9 is a fragmentary isometric view of an extended surface electrode structure showing a liquid distributing member in place.
Figure 11:
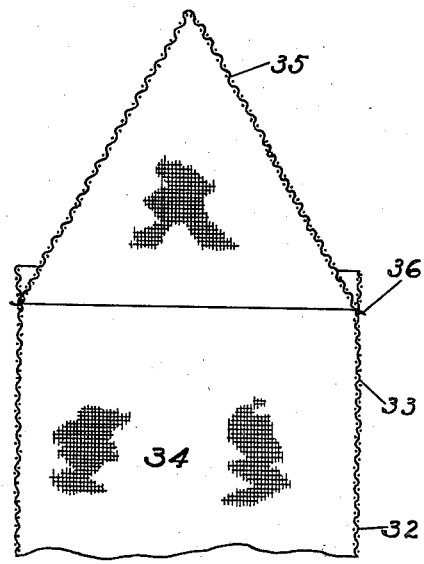
Fig. 11 is a sectional view taken along the line 11—11 of Fig. 10.
Figure 10:
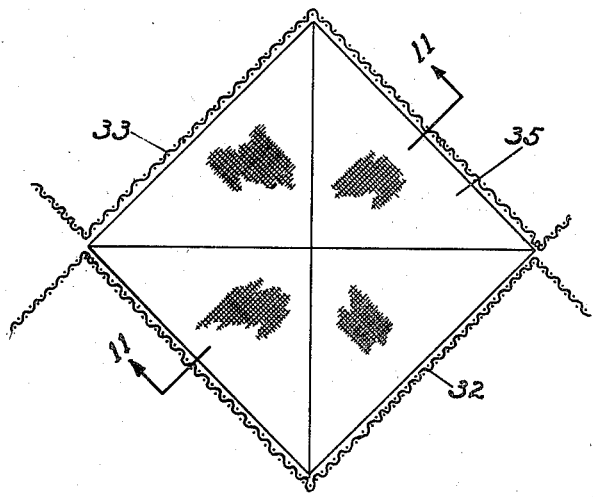
Fig. 10 is a plan view of the structure shown in Fig. 9.

Referring to Figs. 9 through 11, the extended surface electrode assembly 32 is formed largely from perforate web material, specifically woven wire screen. The extended electrode surfaces proper 33 are of substantial vertical extent and are arranged in cellular fashion to provide a plurality of contiguous, vertically extending gas passages 34 having a square cross section. It will be undertood that a discharge electrode 31 projects centrally upwardly into each of the gas passages, as indicated in Fig. 1.

Each of the top openings of the gas passages 34 is capped by a liquid distributing member 35, which, in the modification shown in Figs. 9 through 11, takes the form of an equilateral pyramidal cover inserted a short distance within the top of the gas passage and attached to the electrode members by inweaving the ends of the wires depending from the covers 35 with the wire fabric of the electrodes proper, as shown in Fig. 11 along the line of contact 36. It will be understood that other methods of attachment may be employed to secure the caps to the electrodes proper; for example, the caps may be soldered to the extended surface electrodes. Although it is preferred that the bottoms of the caps contact the sides of the electrodes proper along a line somewhat below the tops of the electrodes, since liquid distribution is thereby facilitated, it will be understood that the line of contact may, if desired, be along the top edges of the extended surface electrodes.

Figures 3, 5:
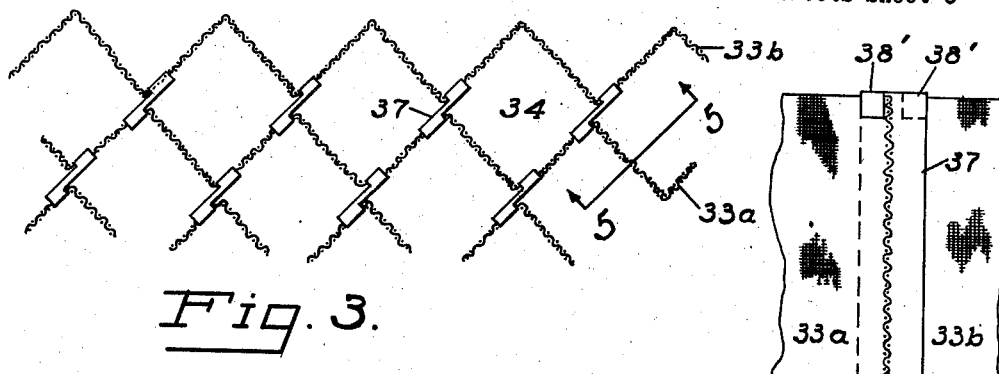
Fig. 3 is a fragmentary plan view of one form of extended surface electrode structure with the liquid distributing members removed.
Fig. 5 is a sectional view taken along the line 5—5 of Fig. 3 showing the clip of Fig. 4 in the electrode assembly.
Figure 4:
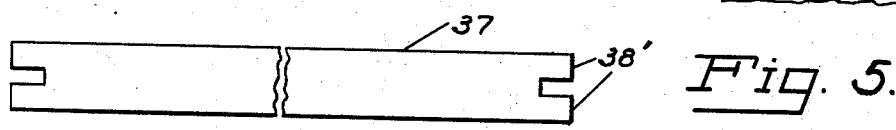
Fig. 4 is a development in detail of a clip used in assembling the electrode structure of Fig. 3.

As shown in Fig. 3, which is a fragmentary plan view of the extended surface electrode structure with the caps 35 removed, the structure may conveniently be assembled from lengths of wire screen appropriately formed and joined together by clips. One such length of wire screen is designated 33a and another is designated 33b. Both lengths of screen are continuous from left to right in the figure and are bent along vertical lines into the zig-zag shape shown. The two lengths of screen are joined together by means of clips 37 along corresponding alternate vertical bends to form the gas passages 34. Clips 37 are formed from sheet metal; one of them is shown developed in Fig. 4. A pair of ears 38' are disposed at each end of the clip, and, as best seen in Fig. 5, these ears are bent over the tops of the screen lengths 33a and 33b to secure the two lengths together. It will be understood that the clips extend for the full height of the screen electrodes and that the ears 38' at the bottom of the clips are bent under the bottom edges of the screen lengths for the purpose of rendering the extended surface electrode structure sufficiently rigid.

Figure 6:
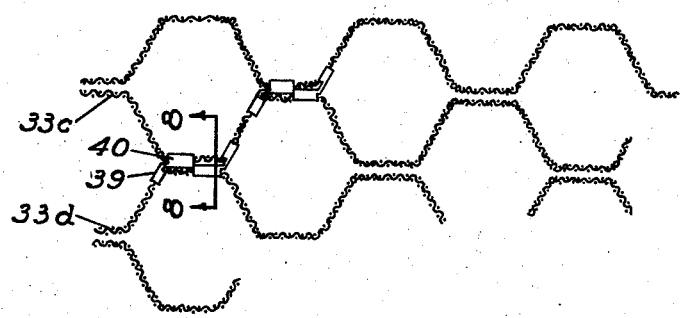
Figs. 6, 7 and 8 are views similar to Figs. 3, 4 and 5 respectively of another form of extended surface electrode structure.
Figures 7, 8:
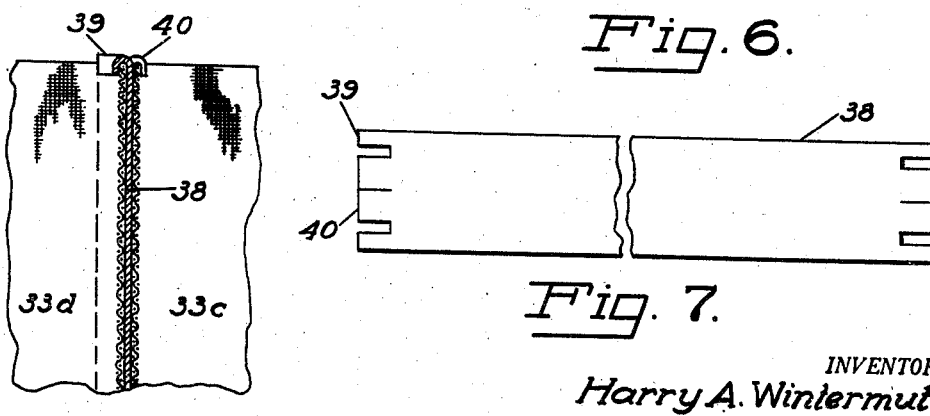

An alternative extended surface electrode structure and its method of assembly is illustrated in Figs. 6 through 8. Here, the gas passages are hexagonal in cross section. The electrode structure is formed from continuous lengths of wire screen, such as 33c and 33d, bent at 120° angles and fastened together by clips 38 having ears 39 and 40 which are bent over adjacent edges of the screen lengths, as shown in Figs. 6 and 8. When the electrode structure takes the alternative form, hexagonal pyramidal caps or liquid distributors (not shown) are provided and are attached to the tops of the electrodes in a manner analogous to the attachment of the caps 35 as described with reference to Figs. 9 through 11.

An extended surface electrode assembly, such as either of those just described or the equivalent thereof, is positioned in the charging section 24 of the precipitator as shown in Fig. 1. The complementary discharge electrodes 31, which project into each gas passage of the extended surface electrode structure 32, have fine-wire discharge portions such as are indicated at 40 and 41. The discharge electrodes 31 are supported on transverse bus bars 42 carried by insulators 43 and insulating bushings 44 secured to the casing 20 in protected recesses 45 at the sides of the casing.

A source of high tension current (not shown) provides power to the discharge electrodes 31 through a lead 46 which passes through the insulating bushing 44 and is connected to the bus bar 42. The casing may be grounded as indicated at 47, and through the casing, the extended surface electrode structure 32 may also be grounded.

The collecting section 25 is very similar in construction and arrangement to the charging section 24. It has complementary precipitating electrodes 48 and collecting electrodes 49.

The precipitating electrodes are mounted similarly to the discharge electrodes 31 on transverse bus bars 50 supported by insulators 51 and insulating bushings 52 housed in recesses at the sides of the casing. A conductor 53, which passes through the bushing 52 and is connected to the bus bar 50, leads high tension current to the precipitating electrodes 48. It will be noted that precipitating electrodes 48 have no discharge points or fine wires.

The collecting electrodes 49 are in the form of perforate web structures similar in every respect to the extended surface electrode structures 32 hereinbefore described in connection with the charging section 24, although the size and shape of the gas passages in the two sections of the precipitator may be different. Specifically, the gas passages 54 provided by the collecting electrode structure 49 may be smaller in cross section than the gas passages 34 of the charging stage to enable the use of lower potentials in the collecting stage. The gas passages 54 may be formed in any appropriate sectional configuration and are capped by the liquid distributing members 55.

The liquid spray device 26 is positioned above the collecting electrode structure 49 to direct a spray of flushing liquid upon the liquid distributors 55 from a plurality of nozzles 56.

Spray eliminator 27 may be of any suitable or conventional design but it is specifically shown as comprising a plurality of horizontally spaced, transverse slats 57 having hooked upper and lower edges. The slats may be inclined in the direction of gas flow and function to remove entrained water from the cleaned gas stream leaving the precipitator.

At the bottom of the plenum chamber 29, a liquid outlet 58 is provided for the discharge of liquid from the sump. Conventional trap means (not shown) may be included in the liquid outlet to prevent leakage of gas therethrough while permitting discharge of liquid.

In operation of the precipitator of Fig. 1, gas to be cleaned is passed through the precipitator from bottom to top. Corona discharge is established in the charging section 24 and a high tension electrostatic field is set up in the collecting section 25 by applying suitable high potential electric currents to the complementary electrodes of these sections, as will be apparent to those skilled in the art of electrical precipitation.

Either continuous or intermittent flushing may be employed. If the flushing of the electrodes is to be carried on continuously during gas cleaning, the spray device 26 is put into operation to deliver steady sprays of flushing liquid, which may be oil, water or water-containing wetting agents or other additive materials, to the liquid distributors 55. If the conditions of operation do not require continuous flushing, the spray device may be turned on periodically or occasionally as desired, either manually or by automatic time-controlled means (not shown), for a time sufficient to effect the desired washing of the electrodes.

The spray of flushing liquid is directed downwardly upon the tops of the distributors 55 of the collecting section, and is intercepted by these distributors. The intercepted liquid is conducted or directed by the distributors to the vertical collecting electrodes proper down which it flows in a uniform film to wash the collecting electrodes free from precipitated material.

Flushing liquid drops from the bottoms of the collecting electrodes 49 and falls in the form of a spray upon the tops of distributors 35 of the charging stage. The distributors 35 serve to intercept and direct flushing liquid downwardly over the surfaces of extended surface electrodes 32 from which the liquid falls to and through the gas flow distributor 23 to the sump at the bottom of the plenum chamber 29 from which the liquid is discharged through outlet 58 to waste or to means (not shown) for recirculating it to the spray device 26.

The gas to be cleaned passes into the plenum chamber 29 from the gas inlet 21. In the plenum chamber, the gas must change direction to flow upwardly through the precipitator. The perforated plate 28 of the gas flow distributor serves to creat some back pressure in the plenum chamber and to render the transverse distribution of volume flow substantially uniform. The transverse web members 30 function to straighten the flow lines of the gas stream and to direct the gas stream substantially rectilinearly toward the gas passages 34 of the charging section.

In the charging section, ionization of the gas and charging of suspended particles occurs, in general together with some precipitation of charged particles upon the extended surface electrodes 32. The gas carrying the charged particles then passes through the gas passages 54 of the collecting stage where the charged particles are largely precipitated upon the collecting electrodes 49. Cleaned gas passes upwardly through the spray eliminator 27, where the bulk of entrained flushing liquid is removed, and out of the precipitator through outlet 22 to use.

Figure 2:
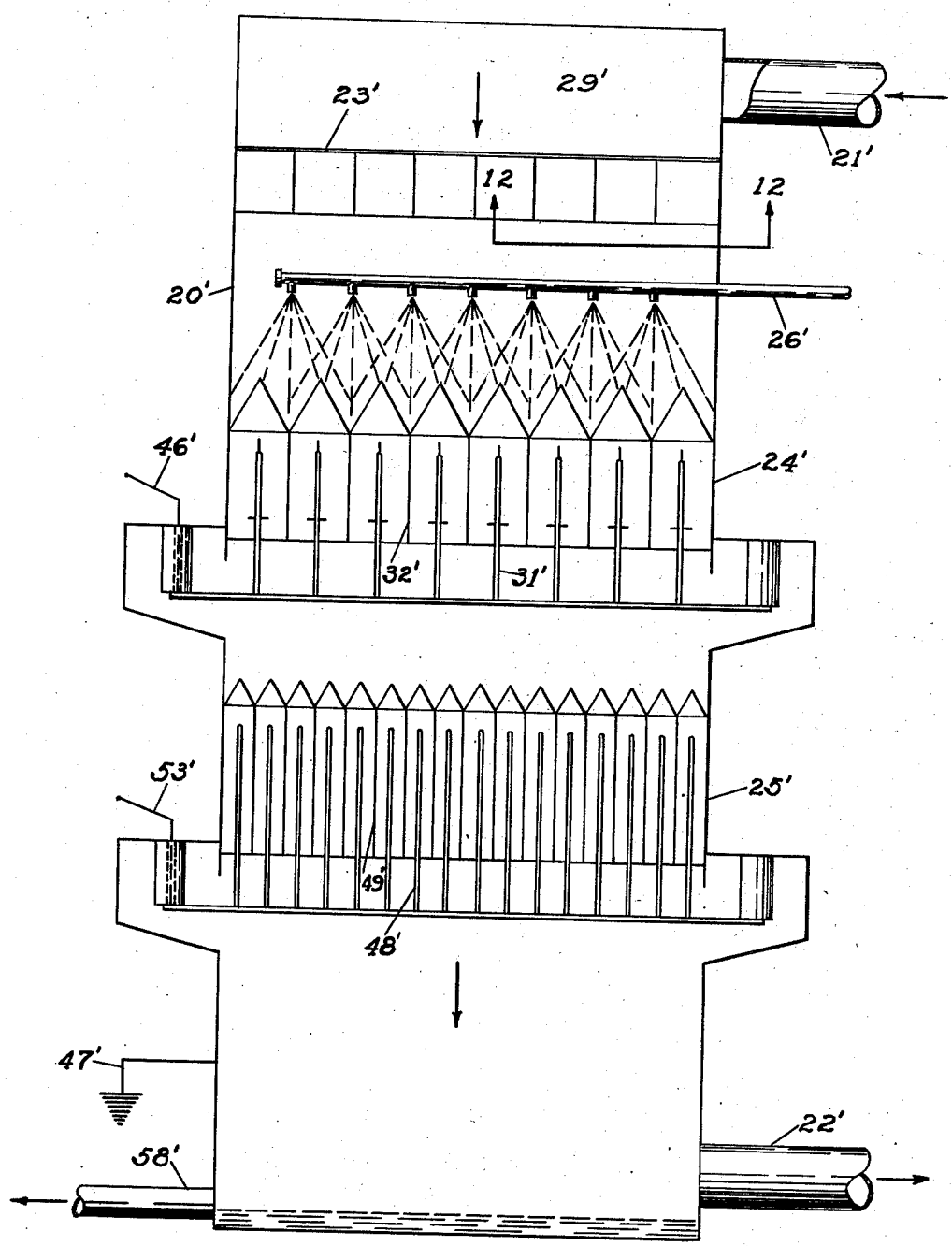
Fig. 2 is a similar view of a down-draft electrical precipitator constructed in accordance with the invention.

The embodiment of the invention shown in Fig. 2 is similar to that shown in Fig. 1. In Fig. 2, primed reference numerals denote parts corresponding to parts bearing like but unprimed numerals in Fig. 1.

Referring to Fig. 2, the precipitator shown is of the vertical-flow, down-draft type having a casing 20', a gas inlet pipe 21' at the top and a gas outlet pipe 22' at the bottom. Disposed within the casing successively in the direction of gas flow is a gas flow distributor 23', a liquid spray device 26', a charging section 24', and a collecting section 25'. A liquid discharge pipe 58' is provided for draining the sump of the precipitator. The upper part of the casing together with the gas flow distributor 23' defines a plenum chamber 29' into which the gas inlet pipe 21' leads gas to be cleaned. Gas flow is indicated by the arrows.

The operation of the modification of Fig. 2 is substantially the same as the operation of the device of Fig. 1 as previously described herein, allowances being made for the reversal of gas flow. If desired, a spray eliminator similar to the spray eliminator 27 of Fig. 1 may be employed at the gas outlet of the down-draft unit of Fig. 2.

Figure 14:
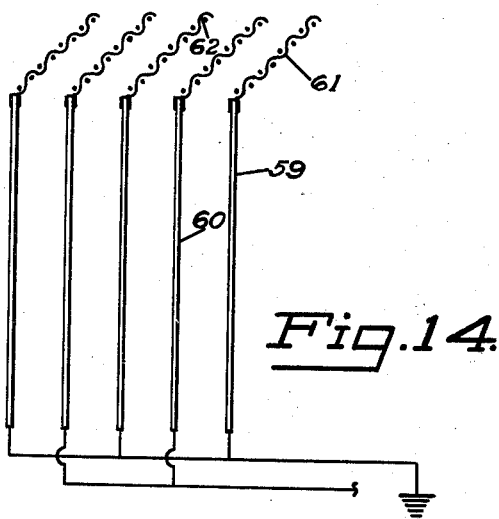
Fig. 14 is an end view of an alternative form of electrode structure embodying modified liquid distributors.
Figure 15:
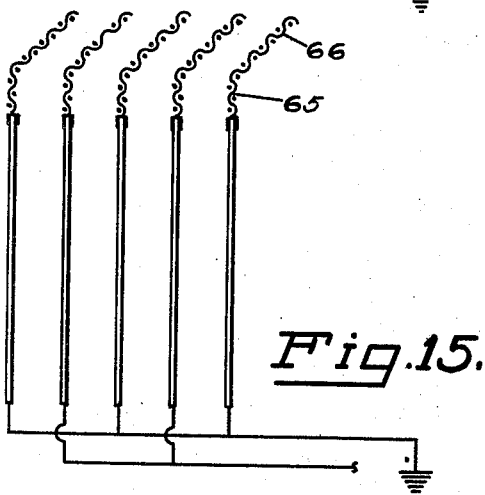
Figs. 15 and 16 are end views of further modifications of electrode structures.
Figure 16:
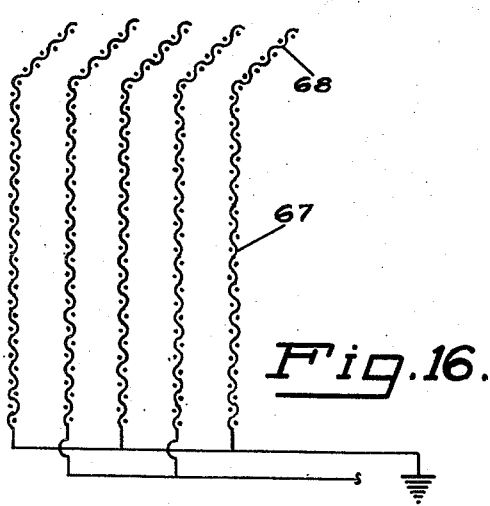

Referring to Figs. 14 through 16, there are shown, in end elevation and somewhat diagrammatically, alternative collecting electrode structures embodying the principles of the invention.

In Fig. 14, the complementary collecting electrodes take the form of vertically extending solid plates 59 and 60 spaced apart horizontally. The plates are alternately oppositely charged to create electrostatic precipitating fields therebetween, as will be understood by those skilled in the art to which this invention pertains.

Along the upper edge of each plate there is attached a spray intercepting and distributing panel 61. These elements may be fabricated from woven wire screen or similar foraminous material and extend upwardly from the plates 59 and 60 at an angle of about 45° for a distance sufficient to bring the upper free edges 62 of the screen panels slightly beyond the extended plane of the next adjacent plate, so that falling liquid spray will be substantially completely intercepted by the panels 61 and directed to and over the plates 59 and 60.

Figure 17:
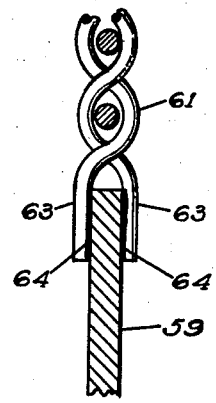
Fig. 17 is an enlarged fragmentary sectional view showing the manner of attachment of a liquid distributing element to an electrode plate.

The manner of attachment of the screen panels to the plates is illustrated in Fig. 17. The lower edge of the screen 61 is frayed out, one or more of the lower horizontal threads or strands being removed from the edge of the fabric if necessary to provide a fringe of loose warp strands 63. Alternate warp strands 63 are laid on opposite sides of the plate 59, following the weave of the fabric, and are secured to the plate as by soldering at 64. The joint so produced is particularly effective for the purposes of the present invention in that it provides a substantially uniform distribution of flushing liquid to both sides of the plate electrode.

The electrode structure shown in Fig. 15 is similar to that shown in Fig. 14, but provides for an even better distribution of flushing liquid between the two sides of an electrode plate. It may be noted that the liquid collecting and distributing screens have a vertically extending section 65 immediately superjacent the plate and an angularly diverging section 66 continuing upwardly from the vertical section and overlying the space between adjacent plates. Although, in the electrode structure of Fig. 14, the flushing liquid may tend to favor the side of the plate electrode that is nearer the under surface of the screen panel, this difficulty is avoided in the device of Fig. 15, wherein the vertical screen section 65 equalizes the distribution of liquid to both sides of the electrode plate.

Fig. 16 shows a somewhat similar construction. However, instead of utilizing solid plate electrodes, the electrodes 67 are of wire screen or the like and have integral spray interceptors 68 formed by bending over the upper sections of the screen panels.

It will be understood that the collecting electrode structures of Figs. 14 through 16 are suitably supported in an appropriate housing and that spray devices are provided for directing a spray of flushing liquid down upon the spray intercepting screens. It will also be evident that the structures illustrated in these figures may be employed with either vertical or horizontal gas flow. Moreover, by the substitution of fine wire discharge electrodes for one set of complementary plate electrodes, a single-stage precipitator is provided.

The spray devices illustrated in Figs. 1 and 2 are merely exemplary and other types of spray devices may be used without departing from the invention. One such alternative spray device which is especially advantageous is shown in Figs. 18 and 19.

In Fig. 18, which is a fragmentary view of the upper part of a precipitator as in Fig. 1, the parts corresponding to like parts in Fig. 1 are given the same reference numerals. The liquid spray device 26 is provided with nondiffusing nozzles 69 which deliver more or less solid jets of flushing liquid. Immediately below each nozzle 69 there is mounted on a horizontal axle 70, supported by a bracket 71, carried by the pipe 26, an automatic liquid deflector 72. The deflector is generally wedge-shaped in the portion 73 above the axle and has a flaring depending skirt portion 74 below the axle. It is mounted for free oscillation on the axle and balanced to assume a rest position with the edge of the wedge 73 uppermost, as shown at A in Fig. 18.

When the flushing liquid is caused to issue from the nozzle 69, it impinges on the upper edge of the deflector as shown at A and, due to slight conditions of unbalance, immediately forces the deflector to turn and assume one of the limiting positions shown at B or C. In either of these positions, the force of the jet is exerted largely upon the skirt portion 74 of the deflector and deflects a turning movement of the deflector to carry it through its rest position and into its opposite limiting position. The deflector continues to oscillate in this manner as long as a jet of liquid impinges upon it. Such oscillating action creates a uniform spray of rather large drops of liquid which descends upon and flushes the electrodes, as hereinbefore described.

The spray device shown in Figs. 18 and 19 has peculiar advantages in the present invention. It requires less headroom than a spray device such as is shown in Figs. 1 and 2, thereby permitting an effective decrease in the over-all height of the precipitator. Additionally, the deflector creates a minimum of fine mist, practically eliminating carrythrough of entrained flushing liquid by the gas being treated and minimizing gas absorption in the flushing liquid which may interfere with efficient flushing where the flushing liquid is recirculated.

The spray intercepting devices and the extended surface electrodes proper where made of screen advantageously are formed from wire screening, preferably of one-eighth to three-sixteenths inch mesh, or the like, but may, if desired, be formed from other foraminous material.

The spray intercepting and distributing elements may be used in some two-stage precipitators on only one set of the extended surface electrodes; for example, it may be desirable to dispense with the elements on one set of extended surface electrodes where the cross section of the gas passages defined by them is relatively small and/or the need for flushing the electrodes of that section is relatively minor as compared with the need for flushing the electrodes of the other section.

The spray intercepting and distributing elements may induce a slight back pressure on the gas flowing through the gas treating zones and thereby assist in the even distribution of gas flow through the several gas passages. It will also be seen that the elements provide an effective additional extended electrode area which may serve for collecting charged particles.

In the devices of Figs. 1 and 2, the discharge electrodes 31 and 31' are shown as having a plurality of discharge points. Such an arrangement allows the use of an increased amount of corona current over an arrangement wherein only one discharge point is provided at the end of the high tension electrode, and this without increasing the undesirable formation of ozone. Such arrangement also serves to distribute the corona discharge over a relatively wide area and thus to charge suspended particles more completely with resultant higher gas cleaning efficiency.

The term "casing" is used herein in a broad sense and is intended to include a shell, housing, or other enclosure such as a specially constructed room for containing the precipitator equipment, and in which the equipment may be removably mounted.

The gas flow distributing assembly shown in detail in Figs. 12 and 13 and electrical precipitators embodying the same are disclosed and claimed in my copending application Serial Number 107,896, filed August 1, 1949.

Electrical precipitators including the liquid spray devices shown in detail in Figs. 18 and 19 are disclosed and claimed in my copending application Serial Number 131,821, filed December 8, 1949.

I claim:

1. In an electrical precipitator including a casing, vertically extending extended surface electrodes defining a plurality of gas passages open at the tops thereof, complementary precipitating electrodes in each of said gas passages, and liquid spray means positioned to direct a spray of flushing liquid above said extended surface electrodes, liquid distributors comprising perforate web members sloping downwardly over the top openings of said gas passages into direct contact with said extended surface electrodes along substantially the entire linear extent of the tops thereof whereby to intercept liquid spray from said spray means and transfer the flow of intercepted liquid to the surfaces of said extended surface electrodes.

2. In an electrical precipitator including a casing, vertically extending extended surface electrodes comprising perforate web members defining a plurality of gas passages open at the tops thereof, complementary precipitating electrodes in each of said gas passages, and liquid spray means positioned to direct a spray of flushing liquid above said extended surface electrodes, liquid distributors comprising perforate web members sloping downwardly over the top openings of said gas passages into direct contact with said extended surface electrodes along substantially the entire linear extent of the tops thereof whereby to intercept liquid spray from said spray means and transfer the flow of intercepted liquid to the surfaces of said extended surface electrodes.

3. In an electrical precipitator including a casing, vertically extending extended surface electrodes comprising woven wire screen members defining a plurality of gas passages open at the tops thereof, complementary precipitating electrodes in each of said gas passages, and liquid spray means positioned to direct a spray of flushing liquid above said extended surface electrodes, liquid distributors comprising woven wire screen members sloping downwardly over the top openings of said gas passages into direct contact with said extended surface electrodes along substantially the entire linear extent of the tops thereof whereby to intercept liquid spray from said spray means and transfer the flow of intercepted liquid to the surfaces of said extended surface electrodes.

4. In an electrical precipitator including a casing, vertically extending extended surface electrodes comprising solid plate members defining a plurality of gas passages open at the tops thereof, complementary precipitating electrodes in each of said gas passages, and liquid spray means positioned to direct a spray of flushing liquid above said extended surface electrodes, liquid distributors comprising perforate web members having a free top edge sloping downwardly over the top openings of said gas passages into direct contact with said extended surface electrodes along substantially the entire linear extent of the tops thereof whereby to intercept liquid spray from said spray means and transfer the flow of intercepted liquid to the surfaces of said extended surface electrodes.

5. In an electrical precipitator including a casing, vertically extending extended surface electrodes comprising mesh screen members defining a plurality of gas passages open at the top thereof, complementary precipitating electrodes in each of said gas passages, and liquid spray means positioned to direct a spray of flushing liquid above said extended surface electrodes, liquid distributors comprising integral portions of the mesh screen material of the extended surface electrodes sloping downwardly over the top openings of said gas passages whereby to intercept liquid spray from said spray means and transfer the flow of the intercepted liquid to the surfaces of the said extended surface electrodes.

6. In an electrical precipitator including a casing, generally vertically extending extended surface electrodes defining a plurality of passages for the flow of gas therethrough, the top edges of said electrodes being substantially horizontal, complementary precipitating electrodes in said gas passages, and liquid spray means positioned above said extended surface electrodes to direct a spray of flushing liquid downwardly thereover, liquid distributors comprising perforate web members positioned below said liquid spray means and sloping downwardly over the top openings of said gas passages into direct contact with the top edges of said extended surface electrodes along substantially the entire linear extent thereof, said perforate web members extending over the spaces between said extended surface electrodes whereby to intercept substantially all of the liquid spray from said spray means and transfer the flow of intercepted liquid to the surfaces of said extended surface electrodes.

7. A two-stage vertical draft electrical precipitator comprising a casing; a collecting section in the upper portion of said casing comprising vertically extending extended surface electrodes defining a plurality of vertically extending gas passages, complementary non-discharge precipitating electrodes in said gas passages, liquid spray means positioned to direct a spray of flushing liquid above said extended surface electrodes, and liquid distributors comprising perforate web members sloping downwardly over the top openings of said gas passages into direct contact with said extended surface electrodes along substantially the entire linear extent of the tops thereof whereby to intercept liquid spray from said spray means and transfer the flow of intercepted liquid to the surfaces of said extended surface electrodes; a charging section in the lower portion of said casing positioned to receive the drip of flushing liquid from said collecting section, said charging section comprising vertically extending extended surface electrodes defining a plurality of vertically extending gas passages, complementary electrodes having a restricted number of discharge elements in said gas passages, and liquid distributors comprising perforate web members sloping downwardly over the top openings of said gas passages into direct contact with said extended surface electrodes along substantially the entire linear extent of the tops thereof whereby to intercept the drip of flushing liquid from said collecting section and transfer the flow of intercepted liquid to the surface of said extended surface electrodes; inlet means directing gas to be cleaned into the bottoms of the gas passages of said charging section; outlet means for cleaned gas issuing from said collecting section; and liquid sump-means receiving the drip of flushing liquid from said charging section.

8. A precipitator as defined in claim 7 wherein said liquid distributors comprise woven wire screen.

9. A precipitator as defined in claim 7 wherein said liquid distributors and said extended surface electrodes comprise woven wire screen.

10. A precipitator as defined in claim 9 wherein said extended surface electrodes are arranged to provide gas passages of rectangular cross section and said liquid distributors comprise pyramidal cap members positioned over the gas outlet ends of said gas passages.

11. In an electrical precipitator as defined in claim 3, said extended surface electrodes being arranged to provide gas passages of rectangular cross-section and said liquid distributors comprising pyramidal cap members positioned over the tops of said gas passages.

12. In an electrical precipitator including a casing, vertically extending extended surface electrodes comprising solid plate members defining a plurality of gas passages open at the tops thereof, complementary precipitating electrodes in said gas passages, and liquid spray means positioned to direct a spray of flushing liquid above said extended surface electrodes, liquid distributors comprising woven wire screen members sloping downwardly over the top openings of said gas passages into direct contact with said extended surface electrodes along substantially the entire linear extent of the tops thereof, the wire threads of the screen members alternately contacting the front and back vertical surfaces of said extended surface electrodes, whereby to intercept liquid spray from said spray means and transfer the flow of intercepted liquid to the front and back surfaces of said extended surface electrodes.

HARRY A. WINTERMUTE.

REFERENCES CITED

The following references are of record in the file of this patent:

UNITED STATES PATENTS

| Number | Name | Date |
|---|---|---|
| 1,339,480 | Schmidt | May 11, 1920 |
| 1,766,421 | Wintermute et al. | June 24, 1930 |
| 1,968,334 | Crowder et al. | July 31, 1934 |
| 2,245,516 | Wintermute | June 10, 1941 |
| 2,374,715 | White | May 1, 1945 |
| 2,404,789 | Burke et al. | July 30, 1946 |

FOREIGN PATENTS

| Number | Country | Date |
|---|---|---|
| 871,845 | France | Jan. 22, 1942 |